UNITED STATES PATENT OFFICE.

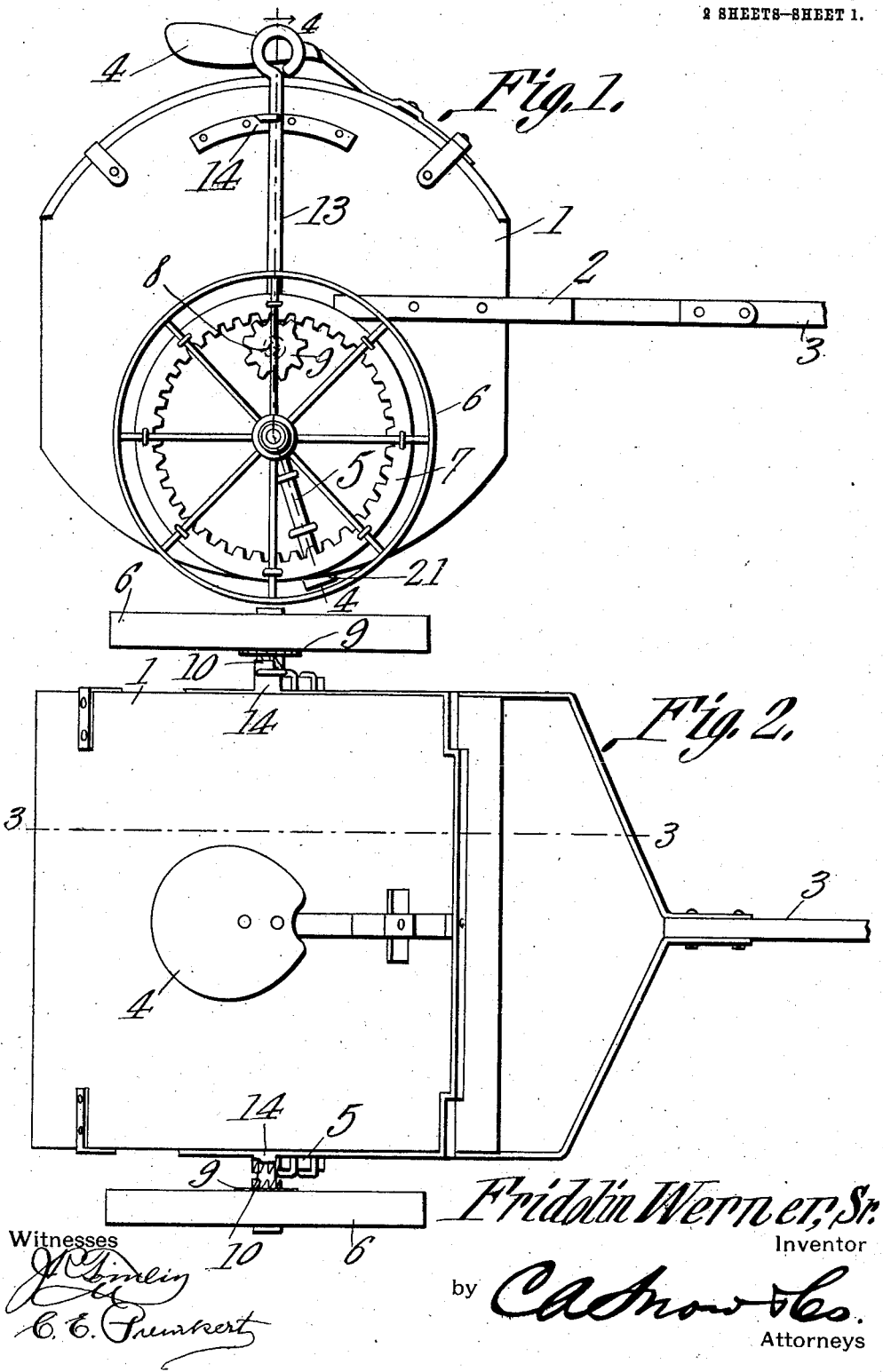

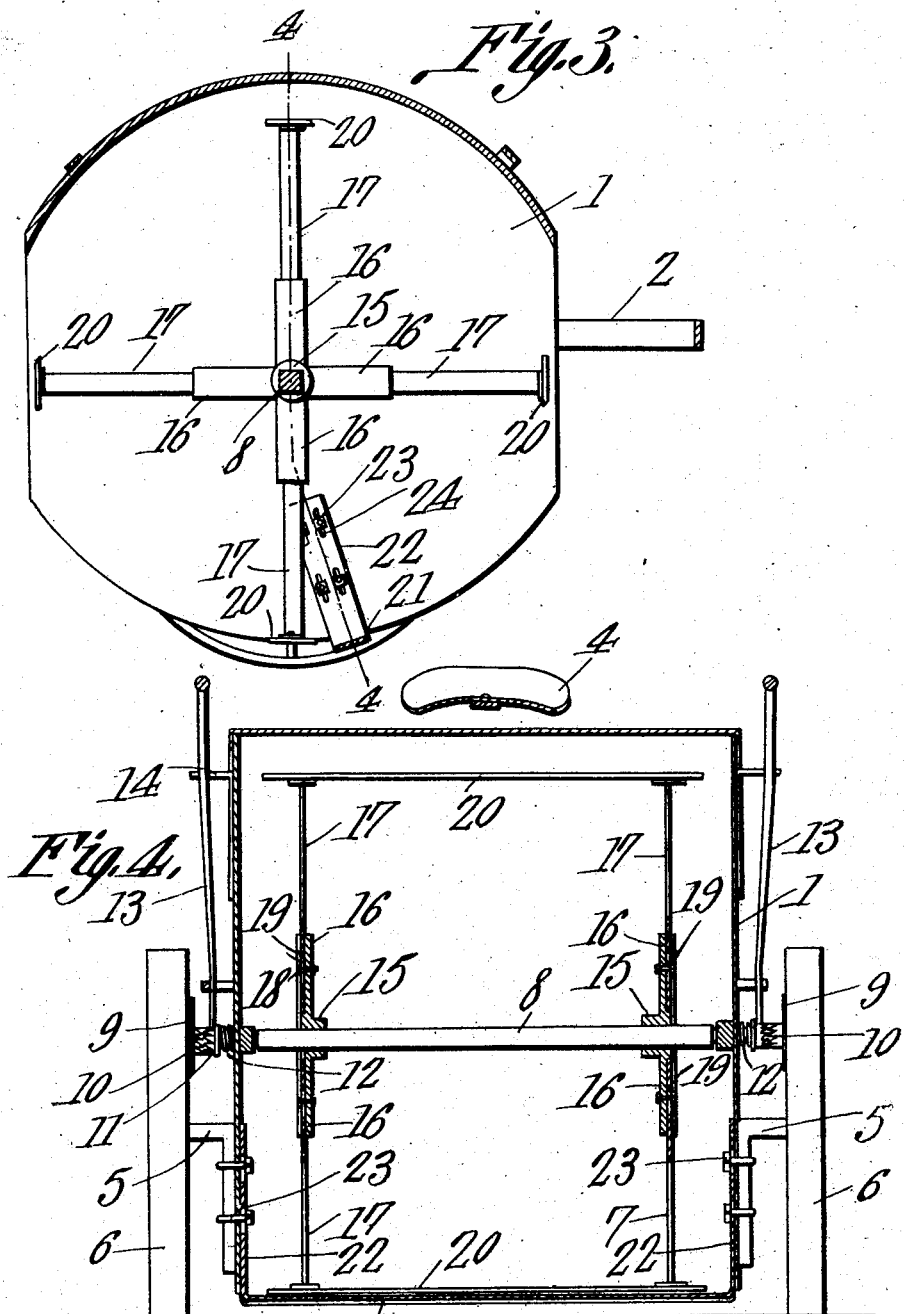

FRIDOLIN WERNER, SR., OF CIBOLO, TEXAS.

STALK-CUTTER.

974,219.   Specification of Letters Patent.   Patented Nov. 1, 1910.

Application filed June 16, 1910. Serial No. 567,256.

*To all whom it may concern:*

Be it known that I, FRIDOLIN WERNER, Sr., a citizen of the United States, residing at Cibolo, in the county of Guadalupe and State of Texas, have invented a new and useful Stalk-Cutter, of which the following is a specification.

This invention relates to a stalk cutter and consists in the novel construction and arrangement of its parts as hereinafter shown and described.

The object of the invention is to provide a simple and an effective machine especially adapted to be used for cutting cotton stalks while they are standing in the ground and with this object in view the machine includes a casing open at its front and rear ends and having axle sections fixed to its sides. Supporting wheels are journaled upon the axle sections and said axle sections are forwardly and downwardly inclined. A cutting blade is attached to the axle sections and its forward cutting edge is upwardly disposed. The supporting wheels carry internal gear rims and a shaft is journaled in the casing and is provided at its ends with pinions which mesh with the said gear rims. Clutch mechanisms are provided and are operable independently to rotate the said shaft from one or both of the said pinions.

In the accompanying drawings,—Figure 1 is a side elevation of the stalk cutter. Fig. 2 is a top plan view of the same. Fig. 3 is a longitudinal sectional view of the same cut on the line 3—3 of Fig. 2. Fig. 4 is a transverse sectional view of the same cut on the line 4—4 of Fig. 1.

The stalk cutter includes a casing 1 which is preferably made from sheet metal and which is open at its forward and rear ends. A yoke 2 is attached at its ends to the sides of the casing 1 and a draft tongue 3 is attached to the said yoke. An operator's seat 4 is mounted upon the top of the casing 1.
Axle sections 5 are fixed to the sides of the casing 1 and supporting wheels 6 are journaled upon the upper ends of the said axle sections. The lower portions of the peripheries of the said supporting wheels 6 project below the horizontal plane at the lowermost points of the sides of the casing 1. Internal gear rims 7 are attached to the inner sides of the supporting wheels 6 in any appropriate manner. A transversely disposed shaft 8 is journaled at its end portions in the sides of the casing 1 and is preferably non-circular at its intermediate portion. Pinions 9 are journaled upon the end portions of the shaft 8 and mesh with the teeth of the gear rims 7. The pinions 9 are provided with clutch hubs 10. Clutch members 11 are slidably mounted upon the end portions of the shaft 8 but are constrained to rotate in unison with the same. Coiled springs 12 are interposed between the inner ends of the clutch members 11 and the sides of the casing 1 and are under tension with a tendency to force the said clutch members 11 toward the clutch hubs 10 of the pinions 9.

Levers 13 are fulcrumed at the sides of the casing 1 and at their lower ends engage the clutch members 11. Rack members 14 are also provided at the sides of the casing 1 and when the upper ends of the levers 13 are moved in outward directions and engage with the notches in the rack members 14 the clutch members 11 are held out of engagement with the clutch hubs 10 of the pinions 9 and against the tension of the springs 12. Hubs 15 are fixed to the intermediate portion of the shaft 8 and are provided with channeled radially disposed arms 16. Bars 17 are adjustably located in the channels of the arms 16 and are adapted to be secured in adjusted positions therein by means of clamp bolts 18 which pass transversely through the slots 19 provided in the said bars and through perforations provided in the arms 16. Chopping blades 20 are carried at the outer ends of the bars 17 and extend in a transverse direction from the bars at one side of the machine to the bars at the other side in the manner as illustrated in Fig. 4 of the drawings. A bar 21 (preferably of steel) is provided with upwardly disposed ends 22 which are adjustably connected with the downwardly disposed portions of the axle sections 5 by means of clamp bolts 23 which surround the lower portions of the said axle sections and pass transversely through the sides of the casing 1 and through elongated slots 24 provided in the end portions 22 of the said bar. The intermediate portion of the bar 21 is located just beyond the path of movement of the arc in which the blades 20 rotate about the shaft 8 and the said bars 21 co-act with the said blades in shearing or cutting the stalks as will be described hereinafter. Inasmuch as the lower portions of the axle sections 5 are downwardly inclined toward their forward ends and the bar 21 is secured to the said axle sections in the manner described, the forward or cutting edge of the said bar 21 is upwardly disposed when the yoke 2 and draft tongue 3 are in horizontal planes.

In operation the machine works as follows: As the machine is drawn along a row of standing stalks one of the supporting wheels 6 will travel at one side of the row while the other supporting wheel 6 will travel at the opposite side of the row. Thus the row passes under the intermediate portion of the casing 1 and between the sides thereof. When the levers 13 are so manipulated that the clutch members 11 are permitted to engage the clutch hub 10 of the pinion 9 and during the rotation of the supporting wheels rotary movement is transmitted from the said supporting wheels through the intermeshing gears 7 and pinions 9 to the shaft 8. Thus the blades 20 are rotated about the axis of the said shaft and as the said blades successively approach the bar 21 the said stalks which are caught between the approaching blade and the said bar are severed or cut at the bar. Therefore it will be seen that the stalks are cut in a downward direction and that the incision is made in lines obliquely of the grain of the stalks and not transversely of the same. By reason of the fact that the cutting edge of the bar 21 is upwardly disposed, the said bar may readily pass over stone or other obstructions without subjecting its edge to damage incident to impact with the same. Also by providing the adjusting means for the said bar 21 and the blades 20 and arms 17, the stalks may be cut at any desired height above the surface of the ground. When the machine is transported from place to place the levers 13 may be moved so that the clutch members 11 are held out of engagement with the clutch hub 10 of the pinion 9 and thus as the machine is drawn over the ground the shaft 8 and its attachment remain at rest.

Having described the invention what I claim as new and desire to secure by Letters Patent is:—

1. A stalk cutter comprising a casing open at its forward and rear ends, a draft means attached to the casing, axle sections attached to the sides of the casing, supporting wheels journaled upon the axle sections, a cutting bar secured at its end portions to the axle sections and sides of the casing, a shaft journaled for rotation in the casing, means operatively connecting said shaft with the supporting wheels, and cutting blades carried by the shaft and adapted to coöperate with the cutting bar during the chopping operation.

2. A stalk cutter comprising a casing open at its forward and rear ends, a draft means attached to the casing, axle sections attached to the sides of the casing and having their lower portions downwardly and forwardly inclined, supporting wheels journaled to the upper ends of the axle sections, a cutter bar secured to the lower portions of the axle sections and the sides of the casing and having its forward cutting edge upwardly disposed, a shaft journaled in the casing, means for operating the shaft from the supporting wheels and cutting blades carried by the shaft and adapted to coöperate with the said cutter bar.

3. A stalk cutter comprising a casing open at its forward and rear ends, a draft means attached to the casing, axle sections attached to the sides of the casing, supporting wheels journaled upon said axle, a cutter bar adjustably attached to the axle sections and sides of the casing, a shaft journaled for rotation in the casing, means for rotating the shaft from the supporting wheels and cutting blades adjustably carried by the shaft and adapted to coöperate with the cutter bar.

4. A stalk cutter comprising a casing open at its forward and rear ends, a draft means attached to the casing, axle sections attached at the sides of the casing and having their lower portions forwardly and downwardly inclined, supporting wheels journaled to the upper portions of the axle sections, a cutter bar adjustably secured to the axle sections and the sides of the casing and having its forward cutting edge upwardly disposed, a shaft journaled for rotation in the casing, means for operating the shaft from the supporting wheels and cutting blades adjustably carried by the shaft and adapted to coöperate with the cutter bar.

In testimony that I claim the foregoing as my own, I have hereto affixed my signature in the presence of two witnesses.

FRIDOLIN WERNER, Sr.

Witnesses:
LOUIS VORDENBAUMEN,
OTTO GROBE.